R. C. WHITE.
CAST IRON CULVERT PIPE.
APPLICATION FILED NOV. 7, 1914.
1,160,554.
Patented Nov. 16, 1915.
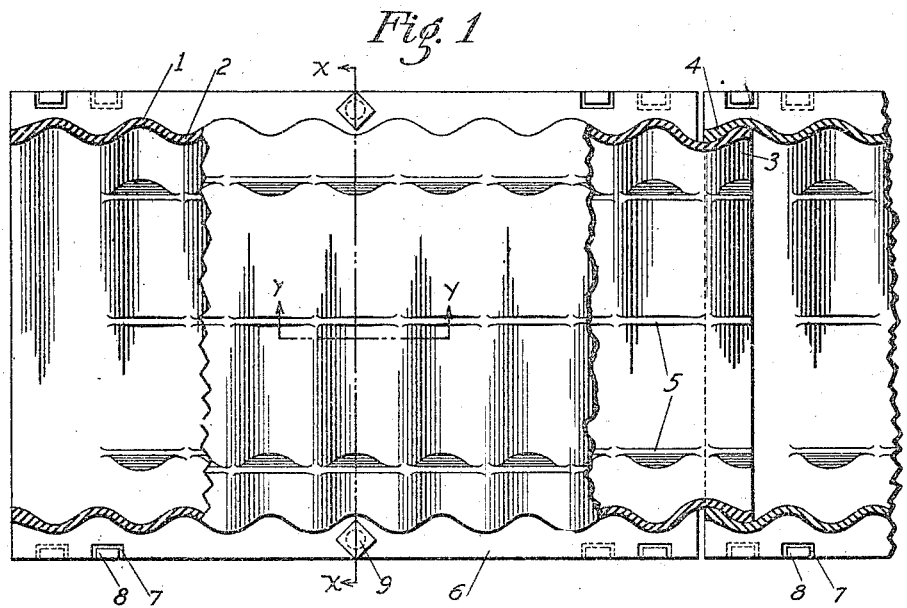
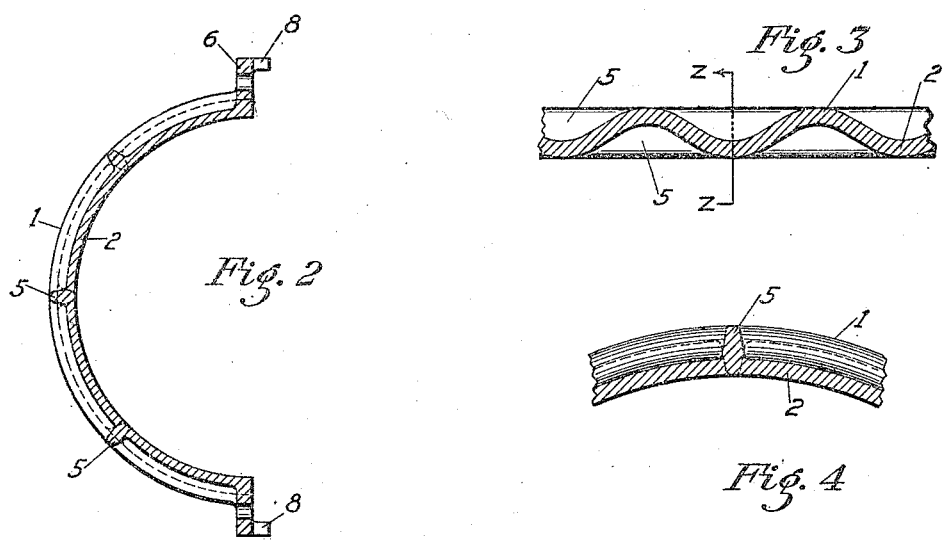
WITNESSES
INVENTOR
Robert C. White

UNITED STATES PATENT OFFICE.

ROBERT C. WHITE, OF BIRMINGHAM, ALABAMA, ASSIGNOR OF ONE-HALF TO GEORGE W. BEGGS, OF BIRMINGHAM, ALABAMA.

CAST-IRON CULVERT-PIPE.

1,160,554.  Specification of Letters Patent.  Patented Nov. 16, 1915.

Application filed November 7, 1914. Serial No. 870,906.

*To all whom it may concern:*

Be it known that I, ROBERT C. WHITE, a citizen of the United States of America, residing at Birmingham, in the county of Jefferson and State of Alabama, have invented certain new and useful Improvements in Cast-Iron Culvert-Pipes, of which the following is a specification.

My invention relates to an improvement in culvert pipe and my object is to increase the strength of the pipe with a minimum increase in its weight and to provide a novel means for interlocking the pipe sections by hub and spigot joint which will positively hold the pipe joints interlocked while permitting them to take curves of comparative short radius, and, where there is washing or other settling of the bed under the pipe, to sink down with the bed without putting sufficient strain on the joints to cause them to break. In carrying out these objects I cast the pipe in longitudinal half sections which are duplicates and, to provide the maximum strength and minimum weight, I cast the sections with circumferential corrugations and, where necessary, with longitudinal, spaced ribs.

My novel means for interlocking the sections of pipe consists in providing the pipes with hub and spigot ends, which, when interlocked, form approximately a ball and socket joint which permits the angular play of the pipe sections in all directions about their axial center line, and, at the same time, provides an interlock which extends entirely about the whole circumference of the pipe, thereby making impossible the separation of the pipe as the result of any relative rotatory movement about their longitudinal axis.

A further advantage of my method of construction for the interlocking hub and spigot ends of the pipe is that I provide a joint which has a clearance which is angular in cross section and which will tend to fill rapidly with soil and to become sealed thereby to prevent the leakage or escape of water from the pipe through its end joints. In these several respects my joint differs radically from the general type of hub and spigot joints. In its preferred construction the pipe has its corrugations and ribs so arranged that a plurality of them will receive and take the weight of wheels passing in all directions.

My invention further comprises the novel details of construction and arrangement of parts which are hereinafter more particularly described and claimed, reference being had to the accompanying drawings which form a part of this specification, and in which:—

Figure 1 is a plan view of the pipe sections constructed in accordance with my invention, the upper half sections being partly broken away. Fig. 2 is a transverse sectional view on the line x—x of Fig. 1. Fig. 3 is a partial sectional view taken on the line y—y of Fig. 1, and Fig. 4 is a sectional view on the line z—z of Fig. 3.

Similar reference numerals refer to similar parts throughout the drawings.

In the preferred embodiment of my invention illustrated, I form the sectional pipe units by two similar half sections, each half section being semi-circular in cross section and being provided in its body portion with a series of corrugations presenting alternating symmetrical ridges 1 and valleys 2 which are uniform throughout the length of the pipe section between its spigot end 3 and its hub end 4. The spigot end 3 flares outwardly and is increased internally in thickness so as to materially strengthen it where the maximum strain from the joint comes on it. The hub end 4 has its maximum and minimum internal diameters a fraction of an inch greater than the corresponding external diameters of the spigot end so that the spigot end of a half pipe section can be set down into the hub end of another half section, in which positions their top edges will stand substantially flush. The hub end is externally thickened to increase its strength. The pipe sections are provided with longitudinal reinforcing ribs 5, of which three are shown in each half section extending in parallelism along what would be the top and bottom portions of the assembled pipe, assuming that the flanges 6 provided along the edges of the sections are disposed in their normal position at the sides of the assembled pipe.

The reinforcing ribs are of uniform thickness and are disposed half within and half without the pipe, as they traverse the alternating external and internal valleys formed by the corrugations and rise to the top level of the external and internal ridges. The internal portions of the ribs are reversely tapered to the external portions, as is seen by reference to Fig. 4. The flanges 6 however extend beyond the ridges of the corrugated pipe body and are provided with slots 7 and lugs 8 so disposed that the lugs on one section when fitted over the other section will interfit with the slots of the latter. The flanges are also provided with bolt holes 9 by means of which the sections can be secured together against falling apart or separating and which will assist the lugs 8 in holding the sections against relative endwise movement. Preferably, the ribs do not project into the hub and spigot ends of the pipe. A sufficient clearance is left in the joint between the hub and spigot ends of the pipe units to permit the assembled pipe to conform to curves of a substantially short radius and this clearance being angular in axial cross section, provides the equivalent of a sealing joint into which mud, clay and dirt from the surrounding earth will enter and settle so as to substantially seal the joint between the pipe and avoid leakage at that point from the pipe, which leakage is objectionable as tending to increase the wash under the pipe and a corresponding lowering of its bed.

The interlock between the pipe sections being annular is unaffected by their relative rotation about their longitudinal axis.

The pipe is designed for very convenient and economical casting and the design of the pipe sections lends itself to the production of the patterns at a small expense.

Without intending to limit myself to the details of construction shown, what I claim as new and desire to secure by Letters Patent, is:—

1. A culvert pipe formed of longitudinal half sections adapted to be superimposed to form a pipe having a continuously corrugated body portion of thin metal, a flaring spigot portion at one end which is thickened internally to reinforce it, and a contracted hub at the other end which is externally thickened to brace it and which is adapted to receive and circumferentially interlock with the spigot end of an adjacent pipe section, substantially as described.

2. A culvert pipe formed in longitudinal half sections, the sections being formed of thin circumferentially corrugated cast metal, and a plurality of longitudinal reinforcing ribs which are cast integral with each section and disposed to cross and substantially fill the valleys of the corrugations both inside and outside of the pipe, and means to interlock the pipe sections against relative vertical and axial displacement.

In testimony whereof I affix my signature in presence of two witnesses.

ROBERT C. WHITE.

Witnesses:
NOMIE WELSH,
ROBT. D. JOHNSTON, Jr.